US010760026B2

(12) United States Patent
Abbott

(10) Patent No.: US 10,760,026 B2
(45) Date of Patent: Sep. 1, 2020

(54) ENZYME TREATMENT OF COAL FOR MERCURY REMEDIATION

(71) Applicant: NOx II, Ltd., Rolling Meadows, IL (US)

(72) Inventor: Murray Abbott, Upper St. Clair, PA (US)

(73) Assignee: NOx II, Ltd., Rolling Meadows, IL (US)

( * ) Notice: Subject to any disclaimer, the term of this patent is extended or adjusted under 35 U.S.C. 154(b) by 0 days.

(21) Appl. No.: 15/780,570

(22) PCT Filed: Nov. 30, 2016

(86) PCT No.: PCT/US2016/064172
§ 371 (c)(1),
(2) Date: May 31, 2018

(87) PCT Pub. No.: WO2017/095895
PCT Pub. Date: Jun. 8, 2017

(65) Prior Publication Data
US 2018/0362870 A1 Dec. 20, 2018

Related U.S. Application Data

(60) Provisional application No. 62/261,933, filed on Dec. 2, 2015.

(51) Int. Cl.
| | | |
|---|---|---|
| *C10L 10/02* | (2006.01) |
| *B01J 20/08* | (2006.01) |
| *C10L 9/10* | (2006.01) |
| *B01J 20/16* | (2006.01) |
| *B01J 20/12* | (2006.01) |
| *F23J 7/00* | (2006.01) |
| *B01J 20/10* | (2006.01) |
| *B01J 20/04* | (2006.01) |
| *F23N 5/00* | (2006.01) |
| *F23K 1/00* | (2006.01) |
| *F23J 15/02* | (2006.01) |
| *C10L 5/04* | (2006.01) |

(52) U.S. Cl.
CPC .............. *C10L 10/02* (2013.01); *B01J 20/04* (2013.01); *B01J 20/041* (2013.01); *B01J 20/08* (2013.01); *B01J 20/10* (2013.01); *B01J 20/12* (2013.01); *B01J 20/16* (2013.01); *C10L 5/04* (2013.01); *C10L 9/10* (2013.01); *F23J 7/00* (2013.01); *F23J 15/02* (2013.01); *F23K 1/00* (2013.01); *F23N 5/003* (2013.01); *C10L 2230/02* (2013.01); *C10L 2230/085* (2013.01); *C10L 2250/02* (2013.01); *F23J 2215/60* (2013.01); *F23K 2201/505* (2013.01); *Y02C 10/08* (2013.01)

(58) Field of Classification Search
CPC .............. C10L 10/02; C10L 2230/085; C10L 2230/02; C10L 2290/20; C10L 2290/22; C10L 2290/541; C10L 2290/542; C10L 9/10; C10L 5/04; C10L 2250/02; B01J 20/041; B01J 20/12; B01J 20/16; B01J 20/04; B01J 20/08; B01J 20/10; F23J 7/00; F23J 2215/60; F23J 15/02; F23K 2201/505; F23K 2200/00; F23K 1/00; F23N 5/003; Y02C 10/08
USPC .......................................... 435/189, 193, 262
See application file for complete search history.

(56) References Cited

U.S. PATENT DOCUMENTS

| | | | |
|---|---|---|---|
| 5,726,056 A * | 3/1998 | Xu ........................... | C10G 1/00 208/14 |
| 6,808,692 B2 | 10/2004 | Oehr | |
| 6,878,358 B2 | 4/2005 | Vosteen et al. | |
| 2006/0210463 A1* | 9/2006 | Comrie .................. | B01D 53/30 423/215.5 |
| 2010/0151554 A1* | 6/2010 | Wang .................... | C12N 9/0008 435/189 |
| 2010/0178624 A1 | 7/2010 | Srinivasachar | |
| 2014/0145111 A1 | 5/2014 | Keiser et al. | |
| 2014/0299028 A1* | 10/2014 | Kotch ...................... | C10L 9/10 110/342 |
| 2014/0346090 A1* | 11/2014 | Urynowicz ............ | C10G 1/002 208/429 |

FOREIGN PATENT DOCUMENTS

| | | | | |
|---|---|---|---|---|
| CN | 101748103 A * | 6/2010 | .......... | C12N 9/0008 |
| CN | 203115991 U * | 8/2013 | | |
| CN | 105316071 A * | 2/2016 | | |
| EP | 0224183 A2 * | 6/1987 | .............. | C10L 1/326 |
| RU | 2440179 C2 | 1/2012 | | |
| WO | WO-2015133977 A1 * | 9/2015 | ................ | C10L 5/32 |
| WO | WO-2015133977 A1 | 9/2015 | | |

OTHER PUBLICATIONS

Nomenclature Committee of International Union of Biochemistry and Molecular Biology Enzyme Nomenclature https://www.qmul.ac.uk/sbcs/iubmb/enzyme/EC1/ International Union of Biochemistry and Molecular Biology Recommendations on Biochemical & Organic Nomenclature, Symbols & Terminology etc. (Nov. 2018).*
International Search Report and Written Opinion issued in PCT/US2016/064172, dated Apr. 13, 2017; ISA/RU.
Extended European Search Report for European Patent Application No. 16871405.3 dated Jun. 26, 2019, 8 pages.

(Continued)

*Primary Examiner* — Pamela H Weiss
(74) *Attorney, Agent, or Firm* — Harness, Dickey & Pierce, P.L.C.

(57) ABSTRACT

Emissions of mercury, NOx, and/or SOx are reduced by enzyme treating coal before combustion, optionally with further treatment of the coal with certain non-bromine containing powder sorbents. y using the steps together, mercury can be reduced by 40% or more, and NOx by 20% or more. Advantageously, no bromine is introduced with the remediation steps.

21 Claims, No Drawings

(56) References Cited

OTHER PUBLICATIONS

Lee, Kwang-Il et al., "Coal Desulfurization Through Reverse Micelle Biocataylsis Process," Prep. Pap., Am. Chem. Soc., Div. Fuel Chem, Bioprocessing of Coal, Jan. 1, 1988, pp. 573-579.
Lee, Kwang-Il et al., "Sulfur Removal from Coal Through Multiphase Media Containing Biocatalysts," Journal of Chemical Technology and Biotechnology, Wiley, vol. 48, No. 1, Jan. 1, 1990, pp. 71-79; ISSN: 0268-2575.

* cited by examiner

ENZYME TREATMENT OF COAL FOR MERCURY REMEDIATION

CROSS-REFERENCE TO RELATED APPLICATIONS

This application is a 371 U.S. National Stage of International Application No. PCT/US2016/064172, filed Nov. 30, 2016, which claims the benefit of U.S. Provisional Application No. 62/261,933, filed on Dec. 2, 2015. The entire disclosures of the above applications are incorporated herein by reference.

INTRODUCTION

To protect the environment and improve the public health, coal burning facilities, such as electrical utilities, are adopting a variety of strategies to mitigate or remediate the release of harmful materials such as NOx, SOx, and mercury into the environment. To this end a number of sorbent based remediation methods have been offered.

Activated carbon can remove mercury when injected into the flue downstream of the coal burning furnace. Injection is preferably carried out in a region of the flue located downstream of a particulate collection device. In this way, the fly ash is removed before it is contaminated with carbon.

Halogens, and especially bromine, have been found to be effective at lowering emissions of mercury. Wherever it is injected, bromine is believed to promote the oxidation of elemental mercury—found naturally in the coal—to mercuric ion, which is water soluble and readily removed by scrubbers and the like. Notable in this field is the work of Professor Vosteen in U.S. Pat. No. 6,878,358 and of Professor Oehr in U.S. Pat. No. 6,808,692, although in the latter the disclosure is limited to applying the bromine into the flue gas downstream of the furnace.

Despite the advantages of using bromine to remove mercury, it has been found in some installations that using bromine has other drawbacks. One is the potential for enhanced corrosion in equipment that comes into contact with the bromine. Another is that bromine is a potential water pollutant. For these reasons the industry is seeking solutions that reduce or eliminate mercury emissions without having to use bromine.

SUMMARY

Significant reductions in mercury, NOx, and/or SOx can be achieved through the use of enzyme treatment of coal, optionally with further treatment with certain non-bromine containing powder sorbents. By using the steps together, mercury can be reduced by 40% or more, and NOx by 20% or more. Advantageously, no bromine is introduced with the remediation steps. The enzyme treatment involves contacting the coal with an aqueous solution of an oxidoreductase enzyme and allowing a time period after application for the enzyme to react with the coal material.

Surprisingly, it is observed that enzyme treatment alone helps to significantly reduce mercury emissions. Adding treatment with the powder sorbent can increase NOx removal to an unexpected extent. The observed results are dose responsive, so that higher levels of mercury, NOx, and SOx remediation can be achieved if desired by increasing the rate at which the enzyme or the powder sorbent components are applied.

DESCRIPTION

In one embodiment, a method of burning coal to reduce emissions of mercury involves the steps of treating coal with an enzyme composition by applying the enzyme composition onto the coal and reacting for a time period to make an enzyme treated coal, and then combusting the enzyme treated coal in the furnace of a coal burning facility to create heat energy and flue gases. In various embodiments, the method further involves measuring the amount of mercury in the flue gas and adjusting the treating step if the measured amount of mercury is above or below a target level. In this way a desired level of mercury emissions can be achieved. The enzyme composition contains water, the enzyme, and any required cofactor of the enzyme, all in a solution at a pH at which the enzyme is active.

In various embodiments, adjusting the treating step involves applying a greater amount of the enzyme composition, applying a lesser amount of the enzyme composition, reacting for a shorter time, or reacting for a longer time. The method can be carried out where the enzyme composition comprises an oxidoreductase classified as EC 1 in the EC number classification of enzymes. In certain embodiments the enzyme composition comprises an oxidase that catalyzes an oxidation reduction reaction involving molecular oxygen as electron acceptor. In an example, the enzyme composition comprises one or more components of the pyruvate dehydrogenase complex.

Certain enzymes require cofactors for proper operation. In exemplary embodiments, the enzyme composition comprises one or more of the known cofactors NAD, NADP, and FADP.

In illustrative embodiments of the enzyme composition, the enzyme comprises laccase, pyruvate dehydrogenase, dihydrolipoyl transacetylase, or dihydrolipoyl dehydrogenase, and the cofactor comprises coenzyme A, CoA-SH, thiamine pyrophosphate, lipoic acid, flavin adenine dinucleotide, or nicotinamide adenine dinucleotide.

To enhance emissions reductions, the method can include the further step of applying a powder sorbent comprising an aluminosilicate material onto the coal before combustion or feeding a powder sorbent comprising an aluminosilicate material into the furnace along with the coal as the enzyme treated coal is fed to the furnace for combustion. For example, the powder sorbent comprises an aluminosilicate clay and one or more of portland cement and cement kiln dust.

Low alkali and low halogen powder sorbent are used in certain embodiments. In an example, the powder sorbent comprises less than 0.5% by weight $Na_2O$, less than 0.5% by weight $K_2O$, or less than 0.5% by weight chlorine. In another example the powder sorbent comprises less than 0.1% by weight $Na_2O$, less than 0.1% by weight $K_2O$, and less than 0.5% by weight chlorine. In various embodiments, one or both of $Na_2O$ and $K_2O$ is less than or equal 0.5% by weight, is less than or equal 0.1% by weight, or is less than or equal to 0.05% by weight. In addition to the low alkali levels, the powder sorbent has low levels of halogen. In various embodiments, the level of chlorine is less than 0.5%, less than 0.3%, less than 0.1%, or less than 0.03%.

In another embodiment, a method for reducing mercury emissions from a coal burning plant is provided without adding any components containing bromine into the coal burning system. The method comprises enzyme treating the coal and combusting the enzyme treated coal in the presence of a powder sorbent comprising an aluminosilicate material.

The powder sorbent can have the characteristics recited above and further described below. For example, in an embodiment the powder sorbent comprises silica, alumina, and calcium. In another, the powder sorbent comprises an aluminosilicate clay. In certain embodiments, the powder sorbent components comprise portland cement or cement kiln dust.

In various embodiments, the powder sorbent comprises components that are added to the coal before, during, or after the enzyme treatment. Alternatively or in addition, the powder sorbent is added into the furnace along with the enzyme treated coal. In some embodiments, the powder sorbent additionally comprises a calcium powder.

In certain embodiments, a low alkali powder sorbent is used that comprises less than 0.5% by weight $Na_2O$, less than 0.5% by weight $K_2O$, or less than 0.5% by weight chlorine. In a non-limiting example, the powder sorbent comprises less than 0.1% by weight $Na_2O$, less than 0.1% by weight $K_2O$, and less than 0.5% by weight chlorine. In various embodiments, one or both of Na2O and K2O is less than or equal 0.5% by weight, is less than or equal 0.1% by weight, or is less than or equal to 0.05% by weight. In addition to the low alkali levels, the powder sorbent has low levels of halogen. In various embodiments, the level of chlorine is less than 0.5%, less than 0.3%, less than 0.1%, or less than 0.03%.

In these and other embodiments disclosed herein, in addition to being low in chlorine the powder sorbent is similarly low in bromine (less than 0.5% by weight, less than 0.1% by weight, less than 0.05% by weight, or less than 0.01% by weight bromine) or is substantially free of bromine.

A coal plant operator using the methods described herein can achieve results wherein emissions of mercury are reduced by at least 40% and emissions of NOx are reduced by at least 20%, relative to emissions achieved when coal is combusted without the enzyme treatment and without using the powder sorbent. Advantageously, the methods do not place any further halogen or bromine burden on plant equipment or in the environment around the facility.

There follow illustrative but non-limiting descriptions of various aspects of the current teachings. Various possibilities of using enzymes, cofactors, buffers, powder sorbents, aluminosilicates, calcium powders, and so on are described, with the idea that any of the variants of one aspect can be combined with variants of other aspects to arrive at description of other embodiments.

Enzyme Composition—Enzymes

The enzyme composition used to treat the coal contains enzyme and any necessary cofactor, in addition to buffering materials to adjust the pH to one at which the enzyme is active. In preferred embodiments, the enzyme composition is stored before use at a temperature below 15° C. or in a range of 4° to 10° C.

The enzymes include ones that catalyze oxidation reduction reactions. These are known as oxidoreductases, such as those classified as EC 1 in the EC number classification of enzymes. Oxidoreductases are further classified into 22 subclasses:

EC 1.1 includes oxidoreductases that act on the CH—OH group of donors (alcohol oxidoreductases)

EC 1.2 includes oxidoreductases that act on the aldehyde or oxo group of donors

EC 1.3 includes oxidoreductases that act on the CH—CH group of donors (CH—CH oxidoreductases)

EC 1.4 includes oxidoreductases that act on the CH—$NH_2$ group of donors (Amino acid oxidoreductases, Monoamine oxidase)

EC 1.5 includes oxidoreductases that act on the CH—NH group of donors

EC 1.6 includes oxidoreductases that act on NADH or NADPH

EC 1.7 includes oxidoreductases that act on other nitrogenous compounds as donors EC 1.8 includes oxidoreductases that act on a sulfur group of donors EC 1.9 includes oxidoreductases that act on a heme group of donors EC 1.10 includes oxidoreductases that act on diphenols and related substances as donors EC 1.11 includes oxidoreductases that act on peroxide as an acceptor (peroxidases)

EC 1.12 includes oxidoreductases that act on hydrogen as donors

EC 1.13 includes oxidoreductases that act on single donors with incorporation of molecular oxygen (oxygenases)

EC 1.14 includes oxidoreductases that act on paired donors with incorporation of molecular oxygen EC 1.15 includes oxidoreductases that act on superoxide radicals as acceptors EC 1.16 includes oxidoreductases that oxidize metal ions EC 1.17 includes oxidoreductases that act on CH or $CH_2$ groups EC 1.18 includes oxidoreductases that act on iron-sulfur proteins as donors EC 1.19 includes oxidoreductases that act on reduced flavodoxin as a donor EC 1.20 includes oxidoreductases that act on phosphorus or arsenic in donors EC 1.21 includes oxidoreductases that act on X—H and Y—H to form an X—Y bond EC 1.97 includes other oxidoreductases Another classification of enzymes able to catalyze oxidation and reduction reactions is found in the Medical Subject Headings (MeSH) established by the National Library of Medicine. In MeSH, classification D08.811 is used for enzymes, with sub-classification D08.811.682 reserved for oxidoreductases. These include the following:

Oxidoreductases
[D08.811.682]

Alcohol Oxidoreductases [D08.811.682.047] +
Arsenate Reductases [D08.811.682.113]
Ascorbate Oxidase [D08.811.682.180]
Ceruloplasmin [D08.811.682.226]
Electron Transport Complex IV [D08.811.682.285]
Hydrogenase [D08.811.682.400]
Laccase [D08.811.682.494]
Luciferases [D08.811.682.517] +
5,10-Methylenetetrahydrofolate Reductase (FADH2) [D08.811.682.550]
NADH, NADPH Oxidoreductases [D08.811.682.608] +
Nitrogenase [D08.811.682.647] +
Nitroreductases [D08.811.682.655] +
Oxidoreductases Acting on Aldehyde or Oxo Group Donors [D08.811.682.657] +
Oxidoreductases Acting on CH—CH Group Donors [D08.811.682.660] +
Oxidoreductases Acting on CH—NH Group Donors [D08.811.682.662] +
Oxidoreductases Acting on CH—NH2 Group Donors [D08.811.682.664] +
Oxidoreductases Acting on Sulfur Group Donors [D08.811.682.667] +
Oxidoreductases, O-Demethylating [D08.811.682.670] +
Oxygenases [D08.811.682.690] +
Methionine Sulfoxide Reductases [D08.811.682.730]
Peroxidases [D08.811.682.732] +
Plastoquinol-Plastocyanin Reductase [D08.811.682.771]

-continued

| Oxidoreductases [D08.811.682] |
| --- |
| Ribonucleotide Reductases [D08.811.682.830] + |
| Succinate Cytochrome c Oxidoreductase [D08.811.682.830] + |
| Superoxide Dismutase [D08.811.682.881] |
| Urate Oxidase [D08.811.682.943] |

The "+" in the table indicates that there are other individual enzymes classified under the noted heading. Thus for example, the class of alcohol reductases includes the subclasses of carbohydrate dehydrogenases (with further sub-subclasses not reported here), hydroxysteroid dehydrogenases, lactate dehydrogenases, NAD (+) and NADP (+) dependent alcohol oxidoreductases, xanthine dehydrogenase, and xanthine oxidase. All, subject to commercial availability, are considered to be suitable for enzyme treating coal according to the current teachings.

So in various embodiments, enzymes with suitable redox capability are selected from those listed in the EC 1 classification or the D08.811.682 MeSH headings.

In various embodiments, the enzyme comprises laccase-isozyme, pyruvate dehydrogenase, dihydrolipoyl transacetylase, or dihydrolipoyl dehydrogenase. The latter three are components of the pyruvate dehydrogenase complex.

Combinations of enzymes can also be used.

Enzyme Composition—Cofactors

Certain oxidoreductases require cofactors to operate. These are well known and include NAD (nicotine adenine dinucleotide), NADP (nicotine adenine dinucleotide phosphate), FAD (flavin adenine dinucleotide), and FADP (flavin adenine dinucleotide phosphate). Each of these in turn can exist in an oxidized form or a reduced form. For example, NAD+ is the oxidized form of NAD. It is an oxidizing agent, accepting electrons from other molecules and becoming reduced. NADH is the corresponding reducing agent. If required, and if the cofactor is not included in the purchased sample of enzyme, the cofactors can be provided in the enzyme composition along with the enzyme.

Enzyme Composition—Buffers

Most enzymes are active at pH close to the physiological pH. Accordingly, the enzyme composition is normally buffered, at approximately a neutral pH or, depending on the enzyme, at a pH from about 5 or 5.5 to a pH of about 8.5 or 9. A pH of about 6 to 8 covers the active pH regions of many enzymes. Buffer systems are standard in enzyme studies and are not further described here. It can be mentioned that the buffer concentration can be low, even on the order of 0.01 M or less, if desired. A non-limiting and simple example of a compound that acts to buffer the pH is the molecule ammonium acetate, which is a salt of ions that are themselves a weak acid and a weak base, buffering in a pH close to 7.

Enzyme Treating Coal

Enzyme treating coal means exposing the coal to enzyme compositions and allowing the enzymes to react while in contact with the coal. While the teachings are not limited by theory, it is believed that the enzyme treatment results in partial oxidation or reduction of the coal, or that the enzyme treatment breaks certain bonds or otherwise reacts to change the reactivity of the coal upon subsequent combustion. For example, the enzyme composition might split the coal "molecules," cleave long chain organic bonds, and/or help decompose fibrous carbons, oil wax, gels and impurities. Empirically, it is observed that coal treated according to the current teachings emits lower levels of mercury when subsequently combusted.

Coal is treated with an enzyme composition by applying the composition onto the coal and reacting for a time period sufficient to cause the coal, when burned, to emit lower levels of mercury from the flue than coal that is not so treated. In practice, the coal is wetted with the enzyme composition, a process that delivers a desired amount of enzyme onto the solid coal. The coal in this way is intimately contacted with the enzymes in the solution that is the enzyme composition. Applying the enzyme composition can be accomplished with any suitable means, such as spraying, pouring, and the like. The idea is to apply enzyme to as much surface area of the coal as possible.

The amount of enzyme to apply to the coal depends on a variety of factors. In non-limiting embodiments, enzyme is applied to the coal in ppm (parts per million by weight) amounts. Ranges include 0.01 to 100 ppm, with the lower level limited by the need to produce a measurable effect, and the upper level of the range limited by such factors as prohibitive cost. In various embodiments, the range includes 0.1 to 100 ppm, 0.1 to 25 ppm, 0.1 to 10 ppm, and 1 to 10 ppm. To apply these ppm levels of enzyme to the coal, the amount of coal to be treated is taken into consideration. Then the ppm weight of the enzyme is calculated, and that amount of enzyme is dissolved into an aqueous solution to make the enzyme composition. The entire enzyme composition is then applied to the coal, as explained further herein.

The time period for reacting is likewise dependent on diverse factors. A time period of hours to days has been found acceptable, as illustrated in the working examples. Generally, the time period is chosen as at least an hour, at least 3 hours, at least 12 hours, or at least a day (24 hours). The maximum time period is limited to the extent possible (to save on turnaround time), but can be 5 days, 4 days, 3 days, 2 days, 1 day, 12 hours, or 3 hours. These minima and maxima can be combined to provide suitable ranges for the time period of reaction. Other factors are among those that can be adjusted to increase or decrease the effect of the enzyme treatment, the effect measured as a reduction in mercury emissions as compared with no enzyme treatment.

The "coals" of the invention refers to any coals. For example, the coals can be metallurgical coal or steam coal. Coal includes anthracite, semi-anthracite, bituminous coal, sub-bituminous coal, lignite, and peat. The coal can be a broken coal (e.g., with particles less than 5 mm in size), or coal powders. The size of the coals is not particularly limited, but in some embodiments is preferably about 100 to 300 mesh. The efficiency of the enzyme treatment can be improved depending upon decreasing the size of the coals.

After the enzyme composition is applied to the coal, there is a further time period of reaction before the enzyme treated coal is to be combusted. During this time period, it is believed that the applied enzymes are catalyzing various oxidation and reduction reactions on the coal substrate, and that these reactions modify the coal in such a way that a reduction of mercury emissions is empirically observed. This is consistent with the current understanding of the structure of coal, which is assumed to provide a rich array of functional groups that are subject to oxidation or reduction and that may provide suitable substrates for the enzymes.

Depending for practical matters on the length of the time period for reaction, the process of enzyme treatment can be carried out in continuous fashion, or in a batch process. For a continuous process, the enzyme composition can be sprayed onto coal as the coal is delivered continuously into a hopper or bunker. At the same time, conveyor means in the hopper or bunker provide for transport of the coal having the enzyme applied in a continuous fashion to an outlet. From the outlet the enzyme treated coal is fed continuously, for example by conveyor belt, to the furnace for combustion. The volume and size of the hopper, bunker, or other plant component, and the operation and speed of continuous belts at the entrance and exit of the component, determine an average residence time that corresponds to the time period needed for reacting the enzyme with the coal.

In a batch process, enzyme composition is applied to a measured amount of coal and the coal is stored for a time corresponding to the reaction time period, and then delivered in batch to the furnace for combustion.

The enzyme treatment is modeled as a chemical process where the enzymes catalyze reactions on the coal substrate. The progress of the enzyme treatment can then be influenced by providing conditions that affect the rate of these chemical reactions. If the reaction rates can be sped up, then in principle the time of reaction can be reduced, in order to achieve an equal reduction in mercury emissions with less reaction time. Conversely, if given conditions provide an adequate amount of emission reductions, it may be possible to scale back the reaction or "titrate" the conditions down to achieve the same emissions reduction using milder (and cheaper) conditions. Or, if for any reason the achieved level of emission reduction exceeds what is required or is more than certain plant equipment can sustain, the conditions can likewise be dialed back to achieved a desired level of reduction.

Factors that affect the time period during which the coal is enzyme treated with the enzyme composition include the length of reaction time, the temperature of reaction, the amount of enzyme applied to the coal by way of the enzyme composition, the particle size of the particulate coal, the relative activity of the enzyme or enzymes used for the treatment, the nature of the enzyme or enzymes used with respect to their native substrates and their relative reactivity with functional groups found in coal, the presence and concentration of cofactors, in non-limiting fashion. Any of these factors can be varied to provide more or less reduction in mercury emissions.

The following will normally "speed up" the reaction, and are expected to increase the amount of mercury reduction empirically observed: 1) providing a longer time period for reaction; 2) increasing the temperature of reaction; 3) providing coal of a smaller particle size, and thereby a larger surface area for reaction; 4) applying a greater amount of enzyme in the treatment step; 5) providing an appropriate cofactor for the enzyme or a higher concentration of cofactor in the enzyme composition; and 6) adjusting the pH of the enzyme composition to provide a more active enzyme.

Conversely, the following adjustments are expected to reduce the effect on mercury emissions by "slowing down" the enzymatic reaction: 1) providing a shorter time period for reaction; 2) decreasing the temperature of reaction; 3) providing coal of a larger particle size, and thereby a smaller surface area for reaction; 4) applying a lesser amount of enzyme in the treatment step; 5) removing an appropriate cofactor for the enzyme or using a lower concentration of cofactor in the enzyme composition; 6) adjusting the pH of the enzyme composition to provide a less active enzyme.

Other adjustments could be expected to have an effect, though the effect (increase or decrease) may not be predictable. These include changing out an enzyme for another, or providing blends of enzyme. The latter could potentially increase the enzymatic effect by providing a diversity of enzymes to attack different functional groups in the coal structure.

In all of these ways, the enzyme treatment is adjusted to achieve a desired result. Normally, if lower emissions of mercury is the goal, the coal operator will be monitoring the level of mercury emitted from the plant. The current teachings involve combusting enzyme treated coal in the furnace of a coal burning facility to create heat energy and flue gases, measuring the amount of mercury in the flue gas, and adjusting the treating step if the measured amount of mercury is not in line with (i.e. is above or below) a target level.

Powder Sorbent

In addition to the enzyme treatment, a powder sorbent can be used in methods of burning coal to reduce emissions of mercury. A method of reducing mercury emission from a coal burning plant thus involves enzyme treating the coal and combusting the enzyme treated coal in the presence of a powder sorbent. In various embodiments, the powder sorbent enhances reduction of emissions of one or more of mercury (Hg), nitrogen oxides (NOx), and sulfur oxides (SOx).

Generally, the powder sorbent contains multiple components, such as the aluminosilicate material and the calcium powders described further below. As such, the powder sorbent can be applied in a single sorbent composition containing all the components. Alternatively, the powder sorbent can be divided into two or more sorbents, all of which together contain all the components of the powder sorbent described herein. In general, the powder sorbent (or its components) can be applied to coal before combustion (and before, during, or after the enzyme treatment), can be delivered into the furnace along with the enzyme treated coal to be combusted, or can even be introduced by injection into the flue gas downstream of the furnace. It is possible to add powder sorbent or its components at two or more of these locations.

Various powder sorbent components are used in combination to treat coal ahead of combustion and/or to be added into the flame or downstream of the flame, preferably at minimum temperatures to assure complete formation of the refractory structures that result in various advantages of the methods. When the components are added to enzyme treated coal before combustion, the product is a refined coal, the use of which lowers environmental pollution and may qualify the utility for certain tax benefits in the United States.

The sorbent components include alumina, silica, and optionally calcium. To reduce fouling when burning subbituminous or lignite coals such as those of the Powder River Basin, it has been found to be advantageous to keep $K_2O$ of the sorbent to a maximum of 1% and to keep $Na_2O$ of the sorbent to a maximum of 1%, wherein percentages are by weight of the powder sorbent containing calcium, alumina, silica, and other components. In embodiments, $Na_2O$ and $K_2O$ are each less than 0.5% or are each less than 0.1%. In various embodiments, one or both of $Na_2O$ and $K_2O$ is less than or equal 0.5% by weight, is less than or equal 0.1% by weight, or is less than or equal to 0.05% by weight. In addition to the low alkali levels, the powder sorbent has low levels of halogen. In addition, in various embodiments, it has also been found advantageous to provide the powder sorbent with low chlorine, e.g. <0.5%, <0.3%, <0.1%, or <0.03%. All percentages recited herein for the sorbent components are by weight based on the total weight of the powder sorbent.

Calcium is provided by adding to the powder sorbent a compound or composition that has a non-negligible amount of calcium. For example, many alkaline powders contain 20% or more calcium, based on CaO. Examples are limestone, lime, calcium oxide, calcium hydroxide (slaked lime), portland cement and other manufactured products or by-products of industrial processes, and calcium-containing aluminosilicate minerals. Silica and alumina content is based on $SiO_2$ and $Al_2O_3$ equivalents, even though it is appreciated that silica and alumina are often present in a more complex chemical or molecular form.

In various embodiments, it is advantageous for the powder sorbent to contain an effective amount of cement kiln dust (CKD), which is believed to contribute to the reduction of NOx from the coal-burning facility. Some CKD has a relatively high chlorine content, even as high as 10%. If CKD is used, depending on the source of CKD and its natural content of alkali and chlorine, the resulting powder could wind up being too high in alkali and/or chlorine for best results when burning sub-bituminous or lignite coals. If so, it is advantageous to blend off some of the CKD with other materials lower in sodium and potassium, preferably to achieve a specification of <1% $Na_2O$ and <1% $K_2O$, or even <0.5% $Na_2O$ and <0.5% $K_2O$, as well as a low chlorine spec as noted. Such low alkali materials include grind outs (cement kiln clinker that may or may not meet cement product specification and is subsequently ground for blending with CKD); kiln feed (the feed stream going into the cement kiln, including all the components for manufacturing cement, e.g. Ca, Mg, Si, Al, Fe, and so on); transition cement (cement product in silo that is emptied to make room for a specific new cement product; weathered clinker (clinker that has been impounded on site, recovered and ground before adding to the CKD); impound CKD (CKD from on-site impound or waste storage); and limestone. To the extent that any of these materials represent waste products that would otherwise go to waste or have to be landfilled, additional environmental benefits are achieved by their use in the sorbents described herein.

In various embodiments, together, the components of the powder sorbent
  enhance reduction of mercury emissions achieved by enzyme treatment alone;
  reduce emissions of mercury, nitrogen oxides, and sulfur oxides;
  reduce emissions of elemental and oxidized mercury;
  increase the efficiency of the coal burning process through de-slagging of boiler tubes;
  prevent the fouling of the furnace by unwanted deposits;
  increase the level of Hg, As, Pb, and/or Cl in the coal ash;
  decrease the levels of leachable heavy metals (such as Hg) in the ash, preferably to levels below the Resource Conservation and Recovery Act (RCRA) or Drinking Water limits; and
  make a highly cementitious ash product.

As used herein, all percentages are on a weight basis, unless indicated as otherwise. It should be noted that the chemical compositions of various materials described herein are expressed in terms of simple oxides calculated from elemental analysis, typically determined by x-ray fluorescence techniques. While the various simple oxides may be, and often are, present in more complex compounds in the material, the oxide analysis is a useful method for expressing the concentration of compounds of interest in the respective compositions.

In a typical coal burning facility, coal arrives in railcars. If sorbents have already been applied, it is a refined coal. It is a raw coal if sorbents have not yet been applied. In a typical illustrative embodiment, the coal is delivered onto a receiving belt, which leads the coal into a pug mill. In various embodiments, the coal is enzyme treated in the pug mill. After the pug mill, the coal is discharged to a feed belt and deposited in a coal storage area. Under the coal storage area there is typically a grate and bin area; from there a belt transports the coal to a bunker.

Stoker furnaces can be fed with enzyme treated coal from the bunker or from a crusher. For furnaces burning pulverized coal, the raw or refined coal is delivered by belt or other means to milling equipment such as a crusher and ultimately to a pulverizer. In a storage system, coal is pulverized and conveyed by air or gas to a collector, from which the pulverized coal is transferred to a storage bin, where the coal can be enzyme treated and fed to the furnace as needed. In a direct fired system, the most common commercial-scale system used for power generation, enzyme treated coal can be pulverized and transported directly to the furnace. In a semi-direct system, the enzyme treated coal goes from the pulverizer to a cyclone collector. The coal is fed directly from the cyclone to the furnace. During operation coal is fed into the furnace and burned in the presence of oxygen. For high Btu fuels, typical flame temperatures in the combustion chamber are on the order of 2700° F. (about 1480° C.) to about 3000° F. (about 1640° C.) or even higher, such as 3300° F. (about 1815° C.) to 3600° F. (about 1982° C.).

A refined coal is produced by adding sorbents to enzyme treated coal before combustion. The sorbents can be added by the coal producer and shipped to the furnace operator, or the refined coal can be produced in a separate facility near or on the property of the operator. In the case of refined coal, a coal containing all the sorbent components is fed to the furnace for combustion.

Alternatively or in addition, sorbent components are added into the coal burning system by injecting them into the furnace during combustion of the enzyme treated fuel. In a preferred embodiment, they are injected into the fireball or close to the fireball, for example where the temperature is above 2000° F., above 2300° F., or above 2700° F. According to the design of the burners and the operating parameters of the furnace, effective sorbent addition takes place along with the fuel, with the primary combustion air, above the flame, with or above the overfire air, and so on. Also depending on the furnace design and operation, sorbents are injected from one or more faces of the furnace and/or from one or more corners of the furnace. Addition of powder sorbent and powder sorbent components tends to be most effective when the temperature at injection is sufficiently high and/or the aerodynamics of the burners and furnace set up lead to adequate mixing of the powder sorbents with the fuel and/or combustion products.

Alternatively or in addition, sorbent addition is made to the convective pathway downstream of the flame and furnace. In various embodiments, optimum injection or application points for sorbents are found by modeling the furnace and choosing parameters (rate of injection, place of injection, distance above the flame, distance from the wall, mode of powder spraying, and the like) that give the best mixing of sorbent, coal, and combustion products for the desired results.

In coal burning systems, hot combustion gases and air move away from the flame through the convective pathway in a downstream direction (i.e., downstream in relation to the fireball). The flue gas pathway of the facility contains a number of zones characterized by the temperature of the gases and combustion products in each zone. Generally, the temperature of the combustion gas falls as it moves in a direction downstream from the fireball. From the furnace, where the coal in one example is burning at a temperature of approximately 2700° F.-3600° F. (about 1480° C.-1982° C.), the fly ash and combustion gases move downstream in the convective pathway to zones of ever decreasing temperature. To illustrate, downstream of the fireball is a zone with temperature less than 2700° F. Further downstream, a point is reached where the temperature has cooled to about 1500° F. Between the two points is a zone having a temperature from about 1500° F. to about 2700° F. Further downstream, a zone of less than 1500° F. is reached, and so on. Further along in the convective pathway, the gases and fly ash pass through lower temperature zones until the baghouse or electrostatic precipitator is reached, which typically has a temperature of about 300° F. before the gases are emitted up the stack.

The combustion gases contain carbon dioxide as well as various undesirable gases containing sulfur, nitrogen, and mercury. The convective pathways are also filled with a variety of ash which is swept along with the high temperature gases. To remove the ash before emission into the atmosphere, particulate removal systems are used. A variety of such removal systems, such as electrostatic precipitators and a bag house, are generally disposed in the convective pathway. In addition, chemical scrubbers can be positioned in the convective pathway. Additionally, there may be provided various instruments to monitor components of the gas such as sulfur (as SOx), nitrogen (as NOx), and mercury.

Thus, in various embodiments, a process according to the present teachings calls for applying sorbents directly into the furnace during combustion (addition "co-combustion"); directly to a fuel such as coal or enzyme treated coal before combustion (addition "pre-combustion" to make a refined coal); directly into the gaseous stream after combustion preferably in a temperature zone of greater than 500° C. and preferably greater than 800° C. (addition "post-combustion"); or in a combination of pre-combustion, co-combustion, and post-combustion additions.

When powder sorbent is added pre-combustion, the sorbent can be added before during, or after enzyme treatment. For example, the coal can be combined with powder sorbent before the enzyme composition is applied to the coal. Alternatively, the powder sorbent is added to the coal during or after the reaction period that finishes the enzyme treatment.

Application of the sorbents is made "into the coal burning system" in any of pre-combustion, co-combustion, or post-combustion modes, or in any combination. When the sorbents are added into the coal burning system, the coal or other fuel is said to be combusted "in the presence" of the various sorbents, sorbent compositions, or sorbent components In a preferred embodiment downstream addition is carried out where the temperature is about 1500° F. (815.5° C.) to about 2700° F. (1482.2° C.). In some aspects, and depending upon the specifics of furnace design and the layout of the convective pathways, the cutoff point or distinction between "into the furnace," "into the fireball," and "into the convective pathways" can be rather arbitrary. At some point, the combustion gases leave what is clearly a burning chamber or furnace and enter a separate structure that is clearly a flue or convective pathway for gases downstream of the furnace. However, many furnaces are quite large and so permit addition of sorbents "into the furnace" at a considerable distance from where the fuel and air are being fed to form the fireball. For example, some furnaces have overfire air injection ports and the like specifically designed to provide additional oxygen at a location above the fireball to achieve more complete combustion and/or control of emissions such as nitrogen oxides. The overfire air ports can be 20 feet or higher above the fuel injection. In various embodiments, sorbent components or compositions are injected directly into the fireball along with coal being fed, at a location above the coal feed, above or below the overfire air ports, or at a higher location within the burning chamber, such as at or just under the nose of the furnace. Each of these locations is characterized by a temperature and by conditions of turbulent flow that contribute to mixing of the sorbents with the fuel and/or the combustion products (such as the fly ash). In embodiments involving applying sorbent compositions into the furnace or downstream of the furnace, application is preferably made where the temperature is above 1500° F., preferably above 2000° F., more preferably where the temperature is above 2300° F., and most preferably where the temperature is above 2700° F.

In various embodiments described herein, the powder sorbent compositions that tend to reduce or remediate the release of mercury, nitrogen, and/or sulfur from coal burning utilities also have the beneficial effect of rendering the ash produced by combustion of the fuel cementitious. As a result, the ash is usable in commerce as a partial or complete replacement for portland cement in various cement and concrete products.

Burning the enzyme treated coal with the sorbent compositions described herein results in an ash that has, in various embodiments, increased levels of the heavy metals compared to coal burned without the sorbent, but which nevertheless contains lower levels of leachable heavy metals than the ash produced without the sorbents. As a result, the ash is safe to handle and to sell into commerce, for example as a cementitious material.

To make the ash products, a carbonaceous fuel such as the enzyme treated coal is burned to produce heat energy from combustion of the carbonaceous material. Unburned material and particulate combustion products form ash, some of which collects at the bottom of the furnace, but the majority of which is collected as fly ash from the flue by precipitators or filters, for example a bag house on a coal burning facility. The content of the bottom ash and the fly ash depends on the chemical composition of the coal and on the amount and composition of sorbent components added into the coal burning facility during combustion.

In various embodiments, mercury emissions from the coal burning facility are monitored. Emissions are monitored as elemental mercury, oxidized mercury, or both. Elemental mercury means mercury in the ground or zero oxidation state, while oxidized mercury means mercury in the +1 or +2 oxidation state. If desired, the addition of powder sorbent can be controlled by considering the measured emissions. Depending on the level of mercury in the flue gas prior to emission from the plant, the amount of sorbent composition added pre-, co-, and/or post-combustion can be raised, lowered, or maintained unchanged.

In various embodiments of burning enzyme treated coal with the added powder sorbent components, mercury and other heavy metals in the coal such as arsenic, antimony, lead, and others report to the bag house or electrostatic precipitator and become part of the overall ash content of the coal burning plant; alternatively or in addition, the mercury and heavy metals are found in the bottom ash. As such, emissions of mercury and other heavy metals from the facility are reduced.

In general, mercury and other heavy metals in the resulting ash are resistant to leaching under acidic conditions, even though they tend to be present in the ash at elevated levels relative to ash produced by burning coal without the sorbent components described herein. Advantageously, heavy metals in the ash do not leach beyond regulatory levels; in fact, a decreased level of leachable heavy metal can be observed in the ash on a μg/L basis, even though the ash normally contains a higher absolute level of heavy metals by virtue of being produced by burning with the sorbents. Because in various embodiments the cementitious nature of the ash is enhanced, the ash from the combustion (coal ash) is valuable for sale in commerce and use, for example, as a cementitious material to make portland cements as well as concrete products and ready mixes.

In one embodiment, the invention provides a method for reducing the amount of oxidized mercury in flue gases that are generated by combustion of mercury-containing carbonaceous fuel such as enzyme treated coal while at the same time producing a cementitious ash product. The method comprises burning the enzyme treated coal in the presence of an alkaline powder sorbent wherein the powder sorbent comprises calcium, silica, and alumina. The alkaline powder is added to the coal pre-combustion, injected into the furnace during combustion, applied into the flue gases downstream of the furnace (preferably where the temperature is 1500° F. or greater), or in any combination. The powders are alkaline, characterized by a pH above 7 when combined with water, preferably above 8 and preferably above 9. Advantageously, the sorbent contains less than 1% each, less than 0.5% each, or less than 0.1% each by weight of alkalis such as $Na_2O$ and $K_2O$. In various embodiments, the sorbent further contains iron and magnesium. In various embodiments, the aluminum content of the sorbent is higher than the alumina content of portland cement, preferably above about 5% or above about 7% alumina.

To monitor emissions while the fuel is burning, a level of mercury (oxidized, elemental, or both) is measured in the flue gases downstream from the furnace. The measured mercury level is compared to a target level and, if the measured level is above the targeted level, the amount of powder sorbent added relative to the amount of fuel being burned is increased. Alternatively, if the measured level is at or below the target level, the rate of sorbent addition can be decreased or maintained unchanged.

In another embodiment, the powder composition is an alkaline sorbent composition that contains an alkaline calcium component as well as significant levels of silica and alumina. In a non-limiting embodiment, the powder composition comprises 2 to 50% of an aluminosilicate material and 50 to 98% by weight of an alkaline powder comprising calcium. In a preferred embodiment, the alkaline powder comprises one or more of lime, calcium oxide, portland cement, cement kiln dust, lime kiln dust, and sugar beet lime, while the aluminosilicate material contains one or more selected from the group consisting of calcium montmorillonite, sodium montmorillonite, and kaolin. In a particular embodiment, the powder sorbent comprises CKD and other material to meet a low alkali specification and/or a low chorine specification.

The powder composition is added to the coal at a rate of about 0.1 to about 10% by weight, based on the amount of coal being treated with the sorbents for a batch process, or on the rate of coal being consumed by combustion for a continuous process. In embodiments, the rate is 0.1-5%, 0.1-2%, 0.1-1.5%, 0.1-1%, from 1 to 8% by weight, 2 to 8% by weight, 4 to 8% by weight, 4 to 6% by weight, or about 6% by weight. In certain embodiments, the powder composition is injected to the fireball or furnace during combustion and/or is applied to the coal under ambient conditions, prior to its combustion. The temperature at the injection point is preferably at least about 1000° F. or higher. For some low value fuels, this corresponds to injection into or close to the fireball.

In certain embodiments, the methods provide coal ash and/or fly ash containing mercury at a level corresponding to capture in the ash of at least 40% of the mercury originally in the coal before combustion. In some embodiments, the mercury level is higher than in known fly ashes due to capture of mercury in the ash rather than release of mercury into the atmosphere. Fly ash produced by the process contains up to 200 ppm mercury or higher; in some embodiments the mercury content of the fly ash is above 250 ppm. Since the volume of ash is normally increased by use of the sorbents, the increased measured levels of mercury represent significant capture in the ash of mercury that, without the sorbents, would have been released into the environment. The content in the fly ash of mercury and other heavy metals such as lead, chromium, arsenic, and cadmium is generally higher than in fly ash produced from burning coal without the added sorbents or sorbent components.

Preferably, the mercury in the coal ash is non-leaching in that it exhibits a concentration of mercury in the extract of less than 0.2 ppm when tested using the Toxicity Characteristic Leaching Procedure (TCLP), test Method 1311 in "Test Methods for Evaluating Solid Waste, Physical/Chemical Methods," EPA Publication SW—846—Third Edition, as incorporated by reference in 40 CFR § 260.11. It is normally observed that fly ash from burning coal with the sorbents described herein has less leachable mercury than ash produced from burning coal without the sorbent, even though the total mercury content in ash produced from the sorbent treated coal is higher by as much as a factor of 2 or more over the level in ash produced by burning without the sorbents. To illustrate, typical ash from burning of PRB coal contains about 100-125 ppm mercury; in various embodiments, ash produced by burning PRB coal with about 6% by weight of the sorbents described herein has about 200-250 ppm mercury or more.

In another embodiment, the invention provides a hydraulic cement product containing portland cement and from 0.1% to about 99% by weight, based on the total weight of the cement product, of a coal ash or fly ash described above.

In a further embodiment, the invention provides a pozzolanic product comprising a pozzolan and from 0.01% to about 99% by weight, based on the total weight of the pozzolanic product of the ash described above.

The invention also provides a cementitious mixture containing the hydraulic cement product.

The invention further provides a concrete ready mix product containing aggregate and the hydraulic cement product.

In another embodiment, a cementitious mixture contains coal ash described herein as the sole cementitious component; in these embodiments, the ash is a total replacement for conventional cements such as portland cement. The cementitious mixtures contain cement and optionally aggregate, fillers, and/or other admixtures. The cementitious mixtures are normally combined with water and used as concrete, mortars, grout, flowable fill, stabilized base, and other applications.

The methods thus encompass burning coal with the added sorbents to produce coal ash and energy for heat or electricity generation. The ash is then recovered and used to formulate cementitious mixtures including cements, mortars, and grouts.

In a preferred embodiment, powder sorbent compositions described herein contain one or more alkaline powders containing calcium, along with lesser levels of one or more aluminosilicate materials. Advantageously, use of the sorbents leads to a reduction in emissions or releases of sulfur, nitrogen, mercury, other heavy metals such as lead and arsenic, and/or chlorine from the coal burning system.

Sorbent compositions used in various embodiments of the invention described above and herein contain components that contribute calcium, silica, and/or alumina, preferably in the form of alkaline powders. In various embodiments, the compositions also contain iron oxide. In a non-limiting example, the powder sorbent contains about 2-10% by weight $Al_2O_3$, greater than 40%, for example about 40-70% CaO, >10% $SiO_2$, about 1-5% $Fe_2O_3$, and <2% of total alkalis such as sodium oxide and potassium oxide, preferably less than 1%. The components comprising calcium, silica, and alumina—and other elements if present—are combined together in a single composition or are added separately or in any combination as components to the fuel burning system. In preferred embodiments, use of the sorbents leads to reductions in the amount of NOx, SOx, and/or mercury released into the atmosphere Advantageously, the sorbent compositions contain suitable high levels of alumina and silica. It is believed that the presence of alumina and/or silica leads to several advantages seen from use of the sorbent. To illustrate, it is believed that the presence of alumina and/or silica and/or the balance of the silica/alumina with calcium, iron, and other ingredients contributes to the low acid leaching of mercury and/or other heavy metals that is observed in ash produced by combustion of coal or other fuels containing mercury in the presence of the sorbents.

As noted, the components that contribute calcium, silica, and/or alumina are preferably provided as alkaline powders. Without being limited by theory, it is believed that the alkaline nature of the sorbent components leads at least in part to the desirable properties described above. For example, it is believed the alkaline nature of the powders leads to a reduction in sulfur pitting. After neutralization, it is believed a geopolymeric ash is formed in the presence of the sorbents, coupling with silica and alumina present in the sorbent to form a ceramic like matrix that reports as a stabilized ash. The stabilized ash is characterized by very lowing leaching of mercury and other heavy metals. In some embodiments, the leaching of mercury is below detectable limits. However, for some coals, it is also observed that high alkali in the sorbent components tends to contribute to undesirable fouling. Accordingly, the present teachings describe how to overcome that disadvantage by using sorbents of lower alkalinity (as measured by content of $Na_2O$ and $K_2O$) and/or lower chlorine, especially for use with sub-bituminous and lignite coals.

Sources of calcium include, without limitation, calcium powders such as calcium carbonate, limestone, dolomite, calcium oxide, calcium hydroxide, calcium phosphate, and other calcium salts. Industrial products such as limestone, lime, slaked lime, and the like contribute major proportions of such calcium salts. As such, they are suitable components.

Other sources of calcium include various manufactured products. Such products are commercially available, and some are sold as waste products or by-products of other industrial processes. In preferred embodiments, the products further contribute either silica, alumina, or both to the compositions of the invention. Non-limiting examples of industrial products that contain silica and/or alumina in addition to calcium include portland cement, cement kiln dust, lime kiln dust, sugar beet lime, slags (such as steel slag, stainless steel slag, and blast furnace slag), paper de-inking sludge ash, cupola arrester filter cake, and cupola furnace dust.

These and optionally other materials are combined to provide alkaline powders or mixtures of alkaline powders that contain calcium, and preferably also contain silica and alumina. Other alkaline powders containing calcium, silica, and alumina include pozzolanic materials, wood ash, rice hull ash, class C fly ash, and class F fly ash. In various embodiments, these and similar materials are suitable components of sorbent compositions, especially if the resulting composition containing them as components falls within the preferred range of 2 to 10% by weight $Al_2O_3$, greater than 40% by weight CaO, greater than 10% by weight $SiO_2$, about 1 to 5% $Fe_2O_3$, and less than 2% by weight total alkali. Mixtures of materials are also used. Non-limiting examples include mixtures of portland cement and lime, and mixtures containing cement kiln dust, such as cement kiln dust and lime kiln dust.

Sugar beet lime is a solid waste material resulting from the manufacture of sugar from sugar beets. It is high in calcium content, and also contains various impurities that precipitate in the liming procedure carried out on sugar beets. It is an item of commerce, and is normally sold to landscapers, farmers, and the like as a soil amendment.

Cement kiln dust (CKD) generally refers to a byproduct generated within a cement kiln or related processing equipment during portland cement manufacturing.

Generally, CKD comprises a combination of different particles generated in different areas of the kiln, pre-treatment equipment, and/or material handling systems, including for example, clinker dust, partially to fully calcined material dust, and raw material (hydrated and dehydrated) dust. The composition of the CKD varies based upon the raw materials and fuels used, the manufacturing and processing conditions, and the location of collection points for CKD within the cement manufacturing process. CKD can include dust or particulate matter collected from kiln effluent (i.e., exhaust) streams, clinker cooler effluent, pre-calciner effluent, air pollution control devices, and the like. Commercial CKD has a range of alkalinity, depending on its source. In some embodiments, it is possible to meet the low alkali spec of the powder sorbents described herein by using the low alkali CKD. If only high alkali CKD is available, it may be necessary to blend off or substitute part of the high alkali CKD product with the lower alkali material described above.

While CKD compositions will vary for different kilns, CKD usually has at least some cementitious and/or pozzolanic properties, due to the presence of the dust of clinker and calcined materials. Typical CKD compositions comprise silicon-containing compounds, such as silicates including tricalcium silicate, dicalcium silicate; aluminum-containing compounds, such as aluminates including tricalcium aluminate; and iron-containing compounds, such as ferrites including tetracalcium aluminoferrite. CKD generally comprises calcium oxide (CaO). Exemplary CKD compositions comprise about 10 to about 60% calcium oxide, optionally about 25 to about 50%, and optionally about 30 to about 45% by weight. In some embodiments, CKD comprises a concentration of free lime (available for a hydration reaction with water) of about 1 to about 10%, optionally of about 1 to about 5%, and in some embodiments about 3 to about 5%. Further, in certain embodiments, CKD comprises compounds containing alkali metals, alkaline earth metals, and sulfur, inter alia.

Other exemplary sources for the alkaline powders comprising calcium, and preferably further comprising silica and alumina, include various cement-related byproducts (in addition to portland cement and CKD described above). Blended-cement products are one suitable example of such a source. These blended cement products typically contain mixes of portland cement and/or its clinker combined with slag(s) and/or pozzolan(s) (e.g., fly ash, silica fume, burned shale). Pozzolans are usually siliceous materials that are not in themselves cementitious, but which develop hydraulic cement properties when reacted with free lime (free CaO) and water. Other sources are masonry cement and/or hydraulic lime, which include mixtures of portland cement and/or its clinker with lime or limestone. Other suitable sources are aluminous cements, which are hydraulic cements manufactured by burning a mix of limestone and bauxite (a naturally occurring, heterogeneous material comprising one or more aluminum hydroxide minerals, plus various mixtures of silica, iron oxide, titania, aluminum silicates, and other impurities in minor or trace amounts). Yet another example is a pozzolan cement, which is a blended cement containing a substantial concentration of pozzolans. Usually the pozzolan cement comprises calcium oxide, but is substantially free of portland cement. Common examples of widely-employed pozzolans include natural pozzolans (such as certain volcanic ashes or tuffs, certain diatomaceous earth, burned clays and shales) and synthetic pozzolans (such as silica fume and fly ash).

Lime kiln dust (LKD) is a byproduct from the manufacturing of lime. LKD is dust or particulate matter collected from a lime kiln or associated processing equipment. Manufactured lime can be categorized as high-calcium lime or dolomitic lime, and LKD varies based upon the processes that form it. Lime is often produced by a calcination reaction conducted by heating calcitic raw material, such as calcium carbonate ($CaCO_3$), to form free lime CaO and carbon dioxide ($CO_2$). High-calcium lime has a high concentration of calcium oxide and typically some impurities, including aluminum-containing and iron-containing compounds. High-calcium lime is typically formed from high purity calcium carbonate (about 95% purity or greater). Typical calcium oxide content in an LKD product derived from high-calcium lime processing is greater than or equal to about 75% by weight, optionally greater than or equal to about 85% by weight, and in some cases greater than or equal to about 90% by weight. In some lime manufacturing, dolomite ($CaCO_3.MgCO_3$) is decomposed by heating to primarily generate calcium oxide (CaO) and magnesium oxide (MgO), thus forming what is known as dolomitic lime. In LKD generated by dolomitic lime processing, calcium oxide can be present at greater than or equal to about 45% by weight, optionally greater than about 50% by weight, and in certain embodiments, greater than about 55% by weight. While LKD varies based upon the type of lime processing employed, it generally has a relatively high concentration of free lime. Typical amounts of free lime in LKD are about 10 to about 50%, optionally about 20 to about 40%, depending upon the relative concentration of calcium oxide present in the lime product generated.

Slags are generally byproduct compounds generated by metal manufacturing and processing. The term "slag" encompasses a wide variety of byproduct compounds, typically comprising a large portion of the non-metallic byproducts of ferrous metal and/or steel manufacturing and processing. Generally, slags are considered to be a mixture of various metal oxides, however they often contain metal sulfides and metal atoms in an elemental form.

Various examples of slag byproducts useful for certain embodiments of the invention include ferrous slags, such as those generated in blast furnaces (also known as cupola furnaces), including, by way of example, air-cooled blast furnace slag (ACBFS), expanded or foamed blast furnace slag, pelletized blast furnace slag, granulated blast furnace slag (GBFS), and the like. Steel slags can be produced from basic oxygen steelmaking furnaces (BOS/BOF) or electric arc furnaces (EAF). Many slags are recognized for having cementitious and/or pozzolanic properties, however the extent to which slags have these properties depends upon their respective composition and the process from which they are derived, as recognized by the skilled artisan. Exemplary slags comprise calcium-containing compounds, silicon-containing compounds, aluminum-containing compounds, magnesium-containing compounds, iron-containing compounds, manganese-containing compounds and/or sulfur-containing compounds. In certain embodiments, the slag comprises calcium oxide at about 25 to about 60%, optionally about 30 to about 50%, and optionally about 30 to about 45% by weight. One example of a suitable slag generally having cementitious properties is ground granulated blast furnace slag (GGBFS).

As described above, other suitable examples include blast (cupola) furnace dust collected from air pollution control devices attached to blast furnaces, such as cupola arrester filter cake. Another suitable industrial byproduct source is paper de-inking sludge ash. As recognized by those of skill in the art, there are many different manufactured/industrial process byproducts that are feasible as a source of calcium for the alkaline powders that form the sorbent compositions of the invention. Many of these well-known byproducts comprise alumina and/or silica, as well. Some, such as lime kiln dust, contain major amounts of CaO and relatively small amounts of silica and alumina. Combinations of any of the exemplary manufactured products and/or industrial byproducts are also contemplated for use as the alkaline powders of certain embodiments of the invention.

In various embodiments, desired treat levels of silica and/or alumina are above those provided by adding materials such as portland cement, cement kiln dust, lime kiln dust, and/or sugar beet lime. Accordingly, it is possible to supplement such materials with aluminosilicate materials, such as without limitation clays (e.g., montmorillonite, kaolins, and the like) where needed to provide preferred silica and alumina levels. In various embodiments, supplemental aluminosilicate materials make up at least about 2%, and preferably at least about 5% by weight of the various sorbent components added into the coal burning system. In general, there is no upper limit from a technical point of view as long as adequate levels of calcium are maintained. However, from a cost standpoint, it is normally desirable to limit the proportion of more expensive aluminosilicate materials. Thus, the sorbent components preferably comprise from about 2 to 50%, preferably 2 to 20%, and more preferably, about 2 to 10% by weight aluminosilicate material such as the exemplary clays. A non-limiting example of a sorbent is about 93% by weight of a blend of CKD and LKD (for example, a 50:50 blend or mixture) and about 7% by weight of an aluminosilicate clay.

In various embodiments, an alkaline powder sorbent composition contains one or more calcium-containing powders such as portland cement, cement kiln dust, lime kiln dust, various slags, and sugar beet lime, along with an aluminosilicate clay such as, without limitation, montmorillonite or kaolin. The sorbent composition preferably contains sufficient $SiO_2$ and $Al_2O_3$ to form a refractory-like mixture with calcium sulfate produced by combustion of the sulfur-containing coal in the presence of the CaO sorbent component such that the calcium sulfate is handled by the particle control system; and to form a refractory mixture with mercury and other heavy metals so that the mercury and other heavy metals are not leached from the ash under acidic conditions. In preferred embodiments, the calcium containing powder sorbent contains by weight a minimum of 10% silica and 2-10% alumina. Preferably, the alumina level is higher than that found in portland cement, that is to say higher than about 5% by weight, preferably higher than about 6% by weight, based on $Al_2O_3$.

In various embodiments, the sorbent components of the alkaline powder sorbent composition work together with optional added halogen (such as bromine) compound or compounds to capture chloride as well as mercury, lead, arsenic, and other heavy metals in the ash, render the heavy metals non-leaching under acidic conditions, and improve the cementitious nature of the ash produced. As a result, emissions of harmful elements are mitigated, reduced, or eliminated, and a valuable cementitious material is produced as a byproduct of coal burning.

Suitable aluminosilicate materials include a wide variety of inorganic minerals and materials. For example, a number of minerals, natural materials, and synthetic materials contain silicon and aluminum associated with an oxy environment along with optional other cations such as, without limitation, Na, K, Be, Mg, Ca, Zr, V, Zn, Fe, Mn, and/or other anions, such as hydroxide, sulfate, chloride, carbonate, along with optional waters of hydration. Such natural and synthetic materials are referred to herein as aluminosilicate materials and are exemplified in a non-limiting way by the clays noted above.

In aluminosilicate materials, the silicon tends to be present as tetrahedra, while the aluminum is present as tetrahedra, octahedra, or a combination of both. Chains or networks of aluminosilicate are built up in such materials by the sharing of 1, 2, or 3 oxygen atoms between silicon and aluminum tetrahedra or octahedra. Such minerals go by a variety of names, such as silica, alumina, aluminosilicates, geopolymer, silicates, and aluminates. However presented, compounds containing aluminum and/or silicon tend to produce silica and alumina upon exposure to high temperatures of combustion in the presence of oxygen.

In one embodiment, aluminosilicate materials include polymorphs of $SiO_2.Al_2O_3$. For example, silliminate contains silica octahedra and alumina evenly divided between tetrahedra and octahedra. Kyanite is based on silica tetrahedra and alumina octahedra. Andalusite is another polymorph of $SiO_2.Al_2O_3$.

In other embodiments, chain silicates contribute silicon (as silica) and/or aluminum (as alumina) to the compositions of the invention. Chain silicates include without limitation pyroxene and pyroxenoid silicates made of infinite chains of $SiO_4$ tetrahedra linked by sharing oxygen atoms.

Other suitable aluminosilicate materials include sheet materials such as, without limitation, micas, clays, chrysotiles (such as asbestos), talc, soapstone, pyrophillite, and kaolinite. Such materials are characterized by having layer structures wherein silica and alumina octahedra and tetrahedra share two oxygen atoms. Layered aluminosilicates include clays such as chlorites, glauconite, illite, polygorskite, pyrophyllite, sauconite, vermiculite, kaolinite, calcium montmorillonite, sodium montmorillonite, and bentonite. Other examples include micas and talc.

Suitable aluminosilicate materials also include synthetic and natural zeolites, such as without limitation the analcime, sodalite, chabazite, natrolite, phillipsite, and mordenite groups. Other zeolite minerals include heulandite, brewsterite, epistilbite, stilbite, yagawaralite, laumontite, ferrierite, paulingite, and clinoptilolite. The zeolites are minerals or synthetic materials characterized by an aluminosilicate tetrahedral framework, ion exchangeable "large cations" (such as Na, K, Ca, Ba, and Sr) and loosely held water molecules.

In other embodiments, framework or 3D silicates, aluminates, and aluminosilicates are used. Framework aluminosilicates are characterized by a structure where $SiO_4$ tetrahedra, $AlO_4$ tetrahedra, and/or $AlO_6$ octahedra are linked in three dimensions. Non-limiting examples of framework silicates containing both silica and alumina include feldspars such as albite, anorthite, andesine, bytownite, labradorite, microcline, sanidine, and orthoclase.

In one aspect, the sorbent powder compositions are characterized in that they contain a major amount of calcium, preferably greater than 20% or greater than 40% by weight based on calcium oxide, and that furthermore they contain levels of silica, and/or alumina higher than that found in commercial products such as portland cement. In preferred embodiments, the sorbent compositions comprise greater than 5% by weight alumina, preferably greater than 6% by weight alumina, preferably greater than 7% by weight alumina, and preferably greater than about 8% by weight alumina.

Enzyme treated coal is treated with sorbent components at rates effective to control the amount of nitrogen, sulfur and/or mercury released into the atmosphere upon combustion. In various embodiments, total treatment levels of the sorbent components ranges from about 0.1% to about 20% by weight, based on the weight of the coal being treated or on the rate of the coal being consumed by combustion, when the sorbent is a powder sorbent containing calcium, silica, and alumina. When the sorbent components are combined into a single composition, the component treat levels correspond to sorbent treat levels. In this way a single sorbent composition can be provided and metered or otherwise measured for addition into the coal burning system. In general, it is desirable to use a minimum amount of sorbent so as not to overload the system with excess ash, while still providing enough to have a desired effect on sulfur and/or mercury emissions. Accordingly, in various embodiments, the treatment level of sorbent ranges from about 0.1% to about 10% by weight, in some embodiments from about 1 or 2% by weight to about 10% by weight. For many coals, an addition rate of 6% by weight of powder sorbent has been found to be acceptable.

In preferred embodiments, nitrogen, mercury, and sulfur are monitored using industry standard methods such as those published by the American Society for Testing and Materials (ASTM) or international standards published by the International Standards Organization (ISO). An apparatus comprising an analytical instrument is preferably disposed in the convective pathway downstream of the addition points of the powder sorbent. In a preferred embodiment, a mercury monitor is disposed on the clean side of the particulate control system. Alternatively or in addition, the flue gases are sampled at appropriate locations in the convective pathway without the need to install an instrument or monitoring device. In various embodiments, a measured level of mercury or sulfur is used to provide feedback signals to pumps, solenoids, sprayers, and other devices that are actuated or controlled to adjust the rate of addition of a powder sorbent composition into the coal burning system. Alternatively or in addition, the rate of powder sorbent addition can be adjusted by a human operator based on the observed levels of mercury, nitrogen, and/or sulfur.

In various embodiments, the ash produced by burning coal in the presence of the sorbents described herein is cementitious in that it sets and develops strength when combined with water. The ash tends to be self-setting due its relatively high level of calcium. The ash serves alone or in combination with portland cement as a hydraulic cement suitable for formulation into a variety of cementitious mixtures such as mortars, concretes, and grouts.

The cementitious nature of ash produced as described herein is demonstrated for example by consideration of the strength activity index of the ash, or more exactly, of a cementitious mixture containing the ash. As described in ASTM C311-05, measurement of the strength activity index is made by comparing the cure behavior and property development of a 100% portland cement concrete and a test concrete wherein 20% of the portland cement is replaced with an equal weight of a test cement. In the standard test, strength is compared at 7 days and at 28 days. A "pass" is considered to be when the strength of the test concrete is 75% of the strength of the portland cement concrete or greater. In various embodiments, ashes of the invention exhibit of strength activity of 100% to 150% in the ASTM test, indicating a strong "pass". Similar high values are observed when tests are run on test mixtures with other than an 80:20 blend of portland cement to ash. In various embodiments, a strength activity index of 100% to 150% is achieved with blends of 85:15 to 50:50, where the first number of the ratio is portland cement and the second number of the ratio is ash prepared according to the invention. In particular embodiments, the strength development of an all-ash test cementitious mixture (i.e., one where ash represents 100% of the cement in the test mixture) is greater than 50% that of the all-portland cement control, and is preferably greater than 75%, and more preferably 100% or more, for example 100-150%. Such results demonstrate the highly cementitious nature of ash produced by burning coal or other fuel in the presence of the sorbent components described herein.

Because ash resulting from combustion of enzyme treated coal contains mercury in a non-leaching form, it is available to be sold into commerce. Non-limiting uses of spent or waste fly ash or bottom ash include as a component in a cement product such as portland cement. In various embodiments, cement products contain from about 0.1% up to about 99% by weight of the coal ash produced by burning compositions according to the invention. In one aspect, the non-leaching property of the mercury and other heavy metals in the coal ash makes it suitable for all known industrial uses of coal ash.

Coal ash, especially the fly ash collected by the particle control systems (bag house, electrostatic precipitators, etc.) is used in portland cement concrete (PCC) as a partial or complete replacement for portland cement. In various embodiments, the ash is used as a mineral admixture or as a component of blended cement. As an admixture, the ash can be total or partial replacement for portland cement and can be added directly into ready mix concrete at the batch plant. Alternatively, or in addition, the ash is inter-ground with cement clinker or blended with portland cement to produce blended cements.

Class F and Class C fly ashes are defined for example in U.S. Standard ASTM C 618. The ASTM Standard serves as a specification for fly ash when it is used in partial substitution for portland cement. It is to be noted that coal ash produced by the methods described herein tends to be higher in calcium and lower in silica and alumina than called for in the specifications for Class F and Class C fly ash in ASTM C 618. Typical values for the fly ash of the invention is >50% by weight CaO, and <25% $SiO_2/Al_2O_3/Fe_2O_3$. In various embodiments, the ash is from 51 to 80% by weight CaO and from about 2 to about 25% of total silica, alumina, and iron oxide. It is observed that fly ash according to the invention is highly cementitious, allowing for substitutions or cutting of the portland cement used in such cementitious materials and cementitious materials by 50% or more. In various applications, the coal ash resulting from burning coal with sorbents described herein is sufficiently cementitious to be a complete (100%) replacement for portland cement in such compositions.

To further illustrate, the American Concrete Institute (ACI) recommends that Class F fly ash replace from 15 to 25% of portland cement and Class C fly ash replace from 20 to 35%. It has been found that coal ash produced according to the methods described herein is sufficiently cementitious to replace up to 50% of the portland cement, while maintaining 28 day strength development equivalent to that developed in a product using 100% portland cement. That is, although in various embodiments the ash does not qualify by chemical composition as Class C or Class F ash according to ASTM C 618, it nevertheless is useful for formulating high strength concrete products.

Coal ash made according to the invention can also be used as a component in the production of flowable fill, which is also called controlled low strength material or CLSM. CLSM is used as a self-leveling, self-compacting back fill material in place of compacted earth or other fill. The ash described herein is used in various embodiments as a 100% replacement for portland cement in such CLSM materials. Such compositions are formulated with water, cement, and aggregate to provide a desired flowability and development of ultimate strength. For example, the ultimate strength of flowable fill should not exceed 1035 kPa (150 pounds per square inch) if removability of the set material is required. If formulated to achieve higher ultimate strength, jack hammers may be required for removal. However, when it is desired to formulate flowable fill mixes to be used in higher load bearing applications, mixtures containing a greater range of compressive strength upon cure can be designed.

Coal ash produced according to the methods described herein is also usable as a component of stabilized base and sub base mixtures. Since the 1950's numerous variations of the basic lime/fly ash/aggregate formulations have been used as stabilized base mixtures. An example of the use of stabilized base is used as a stabilized road base. To illustrate, gravel roads can be recycled in place of using ash according to the composition. An existing road surface is pulverized and re-deposited in its original location. Ash such as produced by the methods described herein is spread over the pulverized road material and mixed in. Following compaction, a seal coat surface is placed on the roadway. Ash according to the invention is useful in such applications because it contains no heavy metals that leach above regulatory requirements. Rather, the ash produced by methods of the invention contains less leachable mercury and less leachable other heavy metals (such as arsenic and lead) than does coal ash produced by burning coal without the sorbents described herein.

Thus, the invention provides various methods of eliminating the need to landfill coal ash or fly ash resulting from combustion of coal that contains high levels of mercury. Instead of a costly disposal, the material can be sold or otherwise used as a raw material.

In a preferred embodiment, use of the powder sorbents results in a cementitious ash that can replace portland cement in whole or in part in a variety of applications. Because of the re-use of the cementitious product, at least some portland cement manufacture is avoided, saving the energy required to make the cement, and avoiding the release of significant amounts of carbon dioxide which would have arisen from the cement manufacture. Other savings in carbon dioxide emissions result from the reduced need for lime or calcium carbonate in desulfurization scrubbers. The invention thus provides, in various embodiments, methods for saving energy and reducing greenhouse emissions such as carbon dioxide. Further detail of various embodiments of this aspect of the invention are given below.

EXAMPLES

Example 1

Fuel Preparation

Bituminous coal was a sample obtained from the coal pile at an electric utility.

The as-received feedstock coal was inspected for surface moisture on receipt and floor-dried as necessary. The air-dried sample was crushed to ¼-inch top size and fed to a hammer mill pulverizer, creating a size distribution of approximately 70 wt % passing 200 mesh for use during testing.

The pulverized coal was split into a feedstock sample and two coal samples that were processed into refined coals. The refined coals were prepared by laying out weighed quantities (about 500 lb) on the floor of the coal preparation facility. Weighed quantities of an enzyme solution, ammonium acetate, and powder sorbent were applied to the coal, which was periodically mixed while the sorbents were applied. The powder sorbent was distributed directly by hand, making several passes over the extent of the coal pile, with mixing of the fuel after each pass. The aqueous enzyme solution and ammonium acetate were placed in a small pressurized metal spray canister such that the spray canister nozzle produced a mist that was applied to the exposed surface of the pile. Treatment required several passes to completely distribute the sorbents. After each pass, a rake was used to turn the pile over, exposing new surface for the next treatment pass. In each case, several small portions of the sorbents were distributed over the coal pile, followed by mixing until the specified treatment rate was achieved. After treatment, the refined coals were homogeneous products that are comparable to that produced at refined coal facilities.

Each of the samples (feedstock coal and refined coals) was transferred to storage hoppers for use in the pilot-scale testing described below. These storage hoppers sit directly above the coal feed hopper during testing. A rotary valve is used to transfer the feedstock and refined coal samples from the storage hoppers to the feed hopper. The storage hoppers and feed hopper are cleaned with a dilute acid solution after each test to remove any trace of the treated fuel.

The as-fired feedstock coal (with no powder sorbent and no enzyme treatment) had a heating value of 12,964 Btu/lb at a moisture content of 3.05 wt %. Moisture-free heating value and ash content were determined to be 13,371 Btu/lb and 9.56 wt %, respectively. The sulfur content was determined to be 1.10 wt % (1.635 lb $SO_2$/MMBtu) on a moisture-free basis. The Hg content was analyzed at 0.0867 µg/g (6.484 lb Hg/TBtu, dry basis), with a chlorine content of 921 µg/g (dry basis).

The as-fired coal 1 (enzyme treated only) had a heating value of 13,071 Btu/lb at a moisture content of 2.54 wt %. Moisture-free heating value and ash content were determined to be 13,412 Btu/lb and 9.34 wt %, respectively. The sulfur content was determined to be 1.10 wt % (1.653 lb $SO_2$/MMBtu) on a moisture-free basis. The Hg content was analyzed at 0.0824 µg/g (6.144 lb Hg/TBtu, dry basis), with a chlorine content of 915 µg/g.

The as-fired Refined coal 2 (powder sorbent and enzyme treated) had a heating value of 13,026 Btu/lb at a moisture content of 2.77 wt %. Moisture-free heating value and ash content were determined to be 13,396 Btu/lb and 9.63 wt %, respectively. The sulfur content was determined to be 1.11 wt % (1.653 lb $SO_2$/MMBtu) on a moisture-free basis. The Hg content was analyzed at 0.0849 µg/g (6.144 lb Hg/TBtu, dry basis), with a chlorine content of 943 µg/g.

Example 2

Operating Conditions

The early-morning hours were used to establish baseline emissions from the combustion of the feedstock coal fired at an average rate of 42.46 lb/hr (0.550 MMBtu/hr) to achieve an average FEGT of 2169° F. Excess oxygen was controlled to an average of 3.06% (about 17.03% excess air) at the furnace exit, with tertiary air utilized at an average 21.71% of total combustion air.

The Refined coal 1 fired during the late-morning and early-afternoon hours was treated with 0.0010 wt % (10.0 ppm) enzyme and 0.00083 wt % (8.3 ppm) ammonium acetate. This coal was fired at an average rate of 42.65 lb/hr (0.557 MMBtu/hr), achieving an average FEGT of 2160° F. at an average excess oxygen level of 3.03% (about 16.87% excess air) at the furnace exit, with tertiary air utilized at an average 21.97% of total combustion air. During this refined coal test period, the $NO_x$ emission reduction goal was not achieved, while the Hg emission reduction goal was achieved.

The Refined coal 2 fired during the late-afternoon hours was treated with 0.0010 wt % (10.0 ppm) enzyme, 0.00083 wt % (8.3 ppm) acetate, and 0.25 wt % powder sorbent. This coal was fired at an average rate of 44.07 lb/hr (0.576 MMBtu/hr), achieving an average FEGT of 2151° F. at an average excess oxygen level of 2.99% (about 16.60% excess air) at the furnace exit, with tertiary air utilized at an average 21.97% of total combustion air. During this refined coal test period, both $NO_x$ and Hg emission reduction goals were achieved.

Example 3

Emissions

Flue gas emissions sampled by continuous emissions monitors (CEMs) were obtained from the duct at the outlet of the furnace and wet scrubber (WS). Hg emissions sampled by continuous mercury monitors (CMMs) were also collected at the WS outlet. The stack emissions (WS outlet) were used to calculate the reductions in $NO_x$ and total Hg and were corrected to 3.0% $O_2$ to account for system air in-leakage at the WS outlet. All reductions reported here were calculated on a mass basis (lb/MMBtu or lb/TBtu).

A summary of the CTF operating conditions and mass emission levels for feedstock and refined coals at the WS outlet is provided in Table 1 with the resultant emission reduction levels at the WS outlet noted during the coal test periods provided in Table 2.

TABLE 1

Summary of CTF Operating Conditions and Mass Emission Levels

| | Fuel Identification: | | |
|---|---|---|---|
| | Feedstock Coal | Refined Coal 1 | Refined Coal 2 |
| Start of Test | 0650 | 1121 | 1521 |
| End of Test | 1040 | 1446 | 1742 |
| Reporting Period, hr:min | 1:00 | 1:00 | 1:30 |
| Refined Coal Treatment, wt % | | | |
| Enzyme | 0.0 | 0.0010 | 0.0010 |
| Acetate | 0.0 | 0.00083 | 0.00083 |
| Powder Sorbent | 0.0 | 0.0 | 0.25 |
| Fuel Feed Rate, lb/hr | 42.46 | 42.65 | 44.07 |
| Firing Rate, MMBtu/hr | 0.550 | 0.557 | 0.576 |
| FEGT, ° F. | 2169 | 2160 | 2151 |
| Tertiary Air, scfm | 22.90 | 22.90 | 23.63 |
| Tertiary Air, % | 21.71 | 21.97 | 21.97 |
| Wet Gas Flow, scfm | 119.37 | 119.07 | 121.63 |
| Dry Gas Flow, scfm | 110.00 | 109.80 | 112.11 |

| Flue Gas Analysis | Furnace | WS | Furnace | WS | Furnace | WS |
|---|---|---|---|---|---|---|
| $O_2$, % | 3.06 | 3.70 | 3.03 | 3.73 | 2.99 | 3.59 |
| $CO_2$, % | 15.83 | 15.26 | 15.79 | 15.17 | 15.82 | 15.30 |
| $SO_2$, ppm | 810 | 40 | 790 | 25 | 770 | 36 |
| $NO_x$, ppm | 305 | 293 | 340 | 305 | 236 | 226 |
| CO, ppm | 18 | 12 | 18 | 11 | 21 | 13 |
| Excess Air, % | 17.03 | | 16.87 | | 16.60 | |

| Corrected to 3.0% $O_2$ | Furnace | WS | Furnace | WS | Furnace | WS |
|---|---|---|---|---|---|---|
| $NO_x$, ppm | 306 | 305 | 340 | 318 | 236 | 234 |
| $SO_2$, ppm | 812 | 42 | 792 | 26 | 770 | 37 |
| $Hg_{(T)}$, µg/dNm$^3$ | — | 0.165 | — | 0.090 | — | 0.082 |

| Mass Emission Rates | WS Out | WS Out | WS Out |
|---|---|---|---|
| $NO_x$, lb/hr | 0.231 | 0.240 | 0.182 |
| $NO_x$, lb/MMBtu | 0.420 | 0.431 | 0.316 |
| $SO_2$, lb/hr | 0.044 | 0.028 | 0.040 |
| $SO_2$, lb/MMBtu | 0.080 | 0.050 | 0.069 |
| $Hg_{(T)}$, lb/hr | $6.81 \times 10^{-8}$ | $4.28 \times 10^{-8}$ | $3.44 \times 10^{-8}$ |
| $Hg_{(T)}$, lb/TBtu | 0.124 | 0.066 | 0.060 |

$NO_x$ Emissions

There is a time delay between initial firing of the refined coal and the moment at which $NO_x$ reduction is calculated, and sufficient time was allotted to achieve the desired $NO_x$ reduction before calculations were made. Because the sorbents used to produce the refined coal have no heating value and emission reductions are reported on a lb/MMBtu basis, there is no dilution in emissions attributable to the sorbents.

Corrected $NO_x$ emissions obtained during combustion of the feedstock coal averaged 305 ppm (0.420 lb $NO_x$/MMBtu) at the WS exit. Corrected $NO_x$ emissions sampled during the firing of the Refined coal 1 treated with an enzyme concentration of 0.0010 wt % (10.0 ppm) and 0.00083 wt % (8.3 ppm) acetate increased to an average of 318 ppm (0.431 lb $NO_x$/MMBtu), representing an increase of 2.62% from feedstock levels.

Corrected $NO_x$ emissions sampled during the firing of the Refined coal 2 treated with 0.0010 wt % (10.0 ppm) enzyme, 0.00083 wt % (8.3 ppm) acetate, and 0.25 wt % S-Sorb were reduced to an average of 234 ppm (0.316 lb $NO_x$/MMBtu), representing a 24.76% reduction from feedstock emission levels.

Hg Emissions

A CMM was installed at the WS outlet during each test period. Sampling activities characterized the feedstock Hg emissions and those obtained during combustion of the refined coal. For each test period, the individual Hg data points were corrected to a constant flue gas $O_2$ concentration and also for the $CO_2$ concentration that was removed during each reporting period. Because the sorbents used to produce the refined coal have no heating value and emission reductions are reported on a lb/TBtu basis, there is no dilution in emissions attributable to the sorbents.

TABLE 2

Summary of $NO_x$ and Hg Emission Levels - WS Outlet and BH Outlet

| | $NO_x$ Results: | | | | |
|---|---|---|---|---|---|
| | $O_2$, % | $NO_x$, ppm | $NO_x$, ppm corrected to 3.00% $O_2$ | $NO_x$, lb/MMBtu | $NO_x$ Reduction, % |
| Feedstock Coal | 3.70 | 293 | 305 | 0.420 | — |
| Refined Coal 1 | 3.73 | 305 | 318 | 0.431 | −2.62 |
| Refined Coal 2 | 3.59 | 226 | 234 | 0.316 | 24.76 |

TABLE 2-continued

Summary of $NO_x$ and Hg Emission Levels - WS Outlet and BH Outlet $Hg_{(T)}$ Results:

| | $O_2$, % | $CO_2$, % | $Hg_{(T)}$, µg/dNm³ corrected to 3.00% $O_2$ | $Hg_{(T)}$, lb/TBtu | Hg Reduction, % |
|---|---|---|---|---|---|
| WS Outlet: | | | | | |
| Feedstock Coal | 3.70 | 15.26 | 0.165 | 0.124 | — |
| Refined Coal 1 | 3.73 | 15.17 | 0.089 | 0.066 | 46.77 |
| Refined Coal 2 | 3.59 | 15.30 | 0.082 | 0.060 | 51.61 |
| BH Outlet: | | | | | |
| Feedstock Coal | 3.70 | 15.26 | 1.239 | 0.972 | — |
| Refined Coal 1 | 3.73 | 15.17 | 0.823 | 0.719 | 42.83 |
| Refined Coal 2 | 3.59 | 15.30 | 0.758 | 0.664 | 47.79 |

$SO_2$ Emissions

For the test series documented here, 90%-95% WS efficiency was specified and was determined from the data collected by the CEMs at the furnace exit and the WS outlet.

The corrected $SO_2$ emissions during firing of the feedstock coal averaged 812 ppm (1.557 lb $SO_2$/MMBtu) before and 42 ppm (0.080 lb $SO_2$/MMBtu) after the WS system, which equates to a 94.86% removal efficiency. Corrected $SO_2$ emissions resulting from combustion of the Refined coal 1 averaged 792 ppm (1.493 lb $SO_2$/MMBtu) before and 26 ppm (0.050 lb $So_2$/MMBtu) after the WS system, which equates to a 96.65% removal efficiency. Corrected $SO_2$ emissions resulting from combustion of the Refined coal 2 averaged 770 ppm (1.446 lb $SO_2$/MMBtu) before and 37 ppm (0.069 lb $SO_2$/MMBtu) after the WS system, which equates to a 95.23% removal efficiency.

Example 4

Fly Ash Analysis

Fly ash was collected by the BH during both the feedstock and refined coal test periods. Average BH inlet temperature was approximately 300° F. during the tests. After completion of the feedstock and refined coal test periods, the BH was back-pulsed, and the fly ash was collected and submitted for bulk inorganic elemental oxide composition by XRF analysis and for Hg, Cl, and ash carbon content. A summary of these analyses and the BH operating conditions is documented in Table 3

TABLE 3

Fly Ash Analysis-BH Hopper Catch
Fuel Identification:

| | Feedstock Coal | | Refined Coal 1 | | Refined Coal 2 | |
|---|---|---|---|---|---|---|
| BH Inlet Temperature, ° F. | | | | | | |
| | 302.30 | | 303.17 | | 302.83 | |
| XRF Ash Analysis, wt % | As-Rec. | $SO_3$-Free | As-Rec. | $SO_3$-Free | As-Rec. | $SO_3$-Free |
| $SiO_2$ | 50.80 | 50.95 | 51.23 | 51.36 | 50.33 | 50.60 |
| $Al_2O_3$ | 28.70 | 28.78 | 28.89 | 28.96 | 28.49 | 28.64 |
| $Fe_2O_3$ | 11.48 | 11.52 | 11.13 | 11.16 | 11.06 | 11.12 |
| $TiO_2$ | 2.17 | 2.17 | 2.14 | 2.15 | 2.10 | 2.12 |
| $P_2O_5$ | 0.20 | 0.20 | 0.19 | 0.19 | 0.21 | 0.21 |
| CaO | 1.16 | 1.16 | 1.12 | 1.12 | 2.24 | 2.25 |
| MgO | 1.33 | 1.33 | 1.29 | 1.30 | 1.30 | 1.30 |
| $Na_2O$ | 0.34 | 0.34 | 0.34 | 0.34 | 0.34 | 0.34 |
| $K_2O$ | 3.53 | 3.54 | 3.41 | 3.42 | 3.41 | 3.43 |
| $SO_3$ | 0.29 | — | 0.26 | — | 0.52 | — |
| Hg, µg/g, dry | 0.89 | | 1.20 | | 1.29 | |
| Cl, µg/g, dry | 65.2 | | 48.8 | | 60.9 | |
| Carbon, wt % | 8.00 | | 8.19 | | 6.38 | |

The bulk inorganic chemistry of the fly ash samples obtained from the BH during the feedstock and refined coal test periods indicated that the feedstock and Refined coal 1 fly ash are compositionally similar. The Refined coal 2 fly ash sample is enriched in CaO and $SO_3$ with a corresponding depletion in $SiO_2$ and $Fe_2O_3$ relative to the feedstock fly ash. Hg content of the feedstock fly ash was determined to be 0.89 µg/g, with a chlorine content of 65.2 µg/g. In the Refined coal 1 fly ash, the Hg content was 1.20 µg/g, with a chlorine content of 48.8 µg/g. In the Refined coal 2 fly ash, the Hg content was 1.29 µg/g, with a chlorine content of 60.9 µg/g. Fly ash carbon content was determined to be 8.00 wt % in the feedstock ash, 8.19 wt % in the Refined coal 1 ash, and 6.38 wt % in the Refined coal 2 ash.

Example 5

Toxicity Characteristic Leaching Procedure

Toxicity characteristic leaching procedure (TCLP) was conducted on the feedstock and refined coal ash samples to determine the concentrations of total Resource Conservation and Recovery Act (RCRA) contaminant metals (arsenic, barium, cadmium, chromium, lead, mercury, selenium, and silver). TCLP is a sample extraction method for chemical analysis employed as an analytical method to simulate leaching through a landfill. The TCLP procedure is generally useful for classifying waste material for disposal options. The concentrations of pollutants in the TCLP leachate are analyzed for substances appropriate to the protocol; for the purposes of this report, the RCRA contaminant metals. The TCLP analysis results for the fly ash generated during combustion of the feedstock and refined coal are given in Table 4.

TABLE 4

Summary of TCLP Results for Total RCRA Metals - BH Ash

| Fuel Description: | Feedstock Ash | Refined Ash 1 | Refined Ash 2 | RCRA Limit, µg/L | Drinking Water MCL,[1] µg/L |
|---|---|---|---|---|---|
| Analyte, µg/L | | | | | |
| Arsenic | 42.0 | 49.5 | 60.0 | 5000 | 50 |
| Barium | 278 | 228 | 254 | 100,000 | 1000 |
| Cadmium | 14.5 | 13.6 | 15.3 | 1000 | 5 |
| Chromium | 55.6 | 54.0 | 56.0 | 5000 | 50 |
| Lead | 11.2 | 12.6 | 9.6 | 5000 | 15 |
| Mercury | <0.1 | <0.1 | <0.1 | 200 | 2 |
| Selenium | 90.9 | 92.9 | 75.3 | 1000 | 50 |
| Silver | <0.5 | <0.5 | <0.5 | 5000 | 50 |

[1]Maximum contamination level

Burning of the Refined 1 CAPP bituminous coal (enzyme treated only) resulted in a reduction of less than 20% in $NO_x$ emissions and at least 40% in Hg emissions as compared to the burning of the feedstock coal after adjustment for the reduced thermal energy of the refined coal as required by Section 45 of the Internal Revenue Code. Burning of the Refined 2 CAPP bituminous coal resulted in a reduction of at least 20% in $NO_x$ emissions and at least 40% in Hg emissions as compared to the burning of the feedstock coal after adjustment for the reduced thermal energy of the refined coal as required by Section 45 of the Internal Revenue Code.

The Refined coal 1 was treated with 0.0010 wt % (10.0 ppm) enzyme and 0.00083 wt % (8.3 ppm) acetate, resulting in an average $NO_x$ emission increase of 2.62% and an average total Hg emission reduction of 46.77% at the WS outlet and 42.83% at the BH outlet when compared with feedstock coal $NO_x$ and Hg emission levels. The Refined coal 2 was treated with 0.0010 wt % (10.0 ppm) enzyme, 0.00083 wt % (8.3 ppm) acetate, and 0.25 wt % powder sorbent, resulting in an average $NO_x$ emission reduction of 24.76% and an average total Hg emission reduction of 51.61% at the WS outlet and 47.79% at the BH outlet when compared with feedstock coal $NO_x$ and Hg emission levels.

What is claimed is:

1. A method of burning coal to reduce emissions of mercury and nitrogen oxides (NOx), comprising:
    treating coal with an enzyme composition comprising an enzyme and a pH buffer by applying the enzyme composition onto the coal and reacting for a time period to make an enzyme treated coal;
    combusting the enzyme treated coal in the presence of a single powder sorbent composition comprising silica, alumina, and calcium in the furnace of a coal burning facility to create heat energy and flue gases to reduce mercury emissions by at least 40% relative to mercury emissions and NOx emissions by at least 20% relative to NOx emissions achieved when coal is combusted without the enzyme treatment and without using the single powder sorbent composition, wherein the single powder sorbent composition comprises one or more components selected from the group consisting of: an aluminosilicate clay, calcium-containing aluminosilicate minerals, Portland cement, cement kiln dust (CKD), clinker, cement kiln feed, transition cement, clinker grind outs, limestone, lime, lime kiln dust, sugar beet lime, slag, calcium oxide, calcium hydroxide, montmorillonite, sodium montmorillonite, kaolin, and combinations thereof, wherein the single powder sorbent composition is the only sorbent composition used before, during, or after the combusting and wherein no additional halogens or halogen-containing compounds are added;
    measuring the amount of mercury in the flue gases; and
    adjusting the treating step if the measured amount of mercury is above or below a target level,
    wherein the enzyme composition comprises water and the enzyme at a pH at which the enzyme is active.

2. The method according to claim 1, wherein adjusting the treating step comprises applying a greater amount of the enzyme composition, applying a lesser amount of the enzyme composition, reacting for a shorter time, or reacting for a longer time.

3. The method according to claim 1, wherein the enzyme composition comprises an oxidoreductase classified as EC 1 in the EC number classification of enzymes.

4. The method according to claim 1, wherein the enzyme composition comprises an oxidase that catalyzes an oxidation reduction reaction involving molecular oxygen as electron acceptor.

5. The method according to claim 1, wherein the enzyme composition comprises one or more components of the pyruvate dehydrogenase complex.

6. The method according to claim 1, wherein the enzyme composition comprises NAD, NADP, or FADP.

7. The method according to claim 1, wherein the enzyme comprises laccase, pyruvate dehydrogenase, dihydrolipoyl transacetylase, or dihydrolipoyl dehydrogenase, and the cofactor comprises coenzyme A, CoA-SH, thiamine pyrophosphate, lipoic acid, flavin adenine dinucleotide, or nicotinamide adenine dinucleotide.

8. The method according to claim 1, further comprising applying the single powder sorbent composition onto the coal before combustion or feeding the single powder sorbent composition into the furnace along with the coal as the coal is fed to the furnace for combustion.

9. The method according to claim 8, wherein the single powder sorbent composition comprises an aluminosilicate clay and one or more of Portland cement and cement kiln dust.

10. The method according to claim 9, wherein the single powder sorbent composition comprises less than 0.5% by weight $Na_2O$, less than 0.5% by weight $K_2O$, or less than 0.5% by weight chlorine.

11. The method according to claim 10, wherein the single powder sorbent composition comprises less than 0.1% by weight $Na_2O$, less than 0.1% by weight $K_2O$, and less than 0.5% by weight chlorine.

12. A method for reducing mercury and nitrogen oxides (NOx) emissions from a coal burning plant, comprising:
    enzyme treating the coal by applying an enzyme and pH buffer; and applying a single powder sorbent composition comprising silica, alumina, and calcium to the enzyme treated coal;

combusting the enzyme treated coal in the presence of the single powder sorbent composition to reduce mercury emissions of the coal burning plant by at least 40% as compared to mercury emissions and NOx emissions by at least 20% relative to NOx emissions achieved when coal is combusted without the enzyme treating and without using the single powder sorbent composition, wherein the single powder sorbent composition comprises one or more components selected from the group consisting of: an aluminosilicate clay, calcium-containing aluminosilicate minerals, Portland cement, cement kiln dust (CKD), clinker, cement kiln feed, transition cement, clinker grind outs, limestone, lime, lime kiln dust, sugar beet lime, slag, calcium oxide, calcium hydroxide, montmorillonite, sodium montmorillonite, kaolin, and combinations thereof and the single powder sorbent composition is the only sorbent composition used before, during, or after the combusting and wherein no additional halogens or halogen-containing compounds are added.

13. The method according to claim 12, wherein the one or more components comprises an aluminosilicate clay.

14. The method according to claim 12, wherein the one or more components comprises Portland cement or cement kiln dust.

15. The method according to claim 12, wherein the single powder sorbent composition comprises less than 0.5% by weight $Na_2O$, less than 0.5% by weight $K_2O$, or less than 0.5% by weight chlorine.

16. The method according to claim 12, wherein the single powder sorbent composition comprises less than 0.1% by weight $Na_2O$, less than 0.1% by weight $K_2O$, and less than 0.5% by weight chlorine.

17. The method according to claim 12, wherein the single powder sorbent composition additionally comprises a calcium powder.

18. The method according to claim 1, wherein the enzyme composition further comprises a cofactor.

19. A method of burning coal to reduce emissions of mercury and nitrogen oxides (NOx), comprising:

treating coal with an enzyme composition comprising an enzyme, a pH buffer, and water, the enzyme composition having a pH at which the enzyme is active and applied onto the coal at greater than or equal to about 1 to less than or equal to about 10 part per million (ppm) of coal and reacting for a time period to make an enzyme treated coal;

combusting the enzyme treated coal in the presence of a single powder sorbent composition comprising silica, alumina, and calcium added to the enzyme-treated coal at a rate of greater than or equal to about 0.1 to less than or equal to about 1% by weight in the furnace of a coal burning facility to create heat energy and flue gases to reduce mercury emissions by at least 40% relative to mercury emissions and nitrogen oxides (NOx) emissions by at least 20% relative to NOx emissions achieved when coal is combusted without the enzyme treatment and without using the single powder sorbent composition, wherein the single powder sorbent composition comprises one or more components selected from the group consisting of: an aluminosilicate clay, calcium-containing aluminosilicate minerals, Portland cement, cement kiln dust (CKD), clinker, cement kiln feed, transition cement, clinker grind outs, limestone, lime, lime kiln dust, sugar beet lime, slag, calcium oxide, calcium hydroxide, montmorillonite, sodium montmorillonite, kaolin, and combinations thereof and the single powder sorbent composition is the only sorbent composition used before, during, or after the combusting and wherein no additional halogens or halogen-containing compounds are added; and measuring the amount of mercury in the flue gases; and adjusting the treating step if a measured amount of mercury is above or below a target level.

20. The method according to claim 19, wherein the enzyme is selected from the group consisting of: laccase-isozyme, pyruvate dehydrogenase, dihydrolipoyl transacetylase, or dihydrolipoyl dehydrogenase.

21. The method according to claim 19, wherein the enzyme comprises laccaseisozyme.

* * * * *